United States Patent
Dover et al.

(10) Patent No.: US 6,893,573 B2
(45) Date of Patent: May 17, 2005

(54) POND FILTER WITH FILTER MEMBER AND NOZZLE

(75) Inventors: Donald L. Dover, Christiansburg, VA (US); Paul Anthony Moore, Christiansburg, VA (US)

(73) Assignee: Tetra Holding (US), Inc., Blacksburg, VA (US)

( * ) Notice: Subject to any disclaimer, the term of this patent is extended or adjusted under 35 U.S.C. 154(b) by 49 days.

(21) Appl. No.: 10/261,576

(22) Filed: Oct. 1, 2002

(65) Prior Publication Data

US 2004/0060852 A1 Apr. 1, 2004

(51) Int. Cl.$^7$ .......................... B01D 29/27; B01D 29/68
(52) U.S. Cl. ..................... 210/767; 210/170; 210/232; 210/416.1; 210/411; 210/448
(58) Field of Search .......................... 210/167, 169, 210/170, 232, 416.1, 407, 416.2, 409, 411, 413, 448, 767, 780, 798

(56) References Cited

U.S. PATENT DOCUMENTS

| | | | | |
|---|---|---|---|---|
| 2,271,814 A | * | 2/1942 | Coolidge | 210/333.1 |
| 2,762,943 A | * | 5/1957 | Mackintosh | 210/448 |
| 3,237,772 A | | 3/1966 | Hruby, Jr. | |
| 3,253,712 A | | 5/1966 | Posgate | |
| 3,254,772 A | * | 6/1966 | Hornbostel, Jr. | 210/408 |
| 3,365,864 A | * | 1/1968 | Iizima | 55/471 |
| 3,769,818 A | * | 11/1973 | Smith | 68/18 F |
| 4,108,775 A | | 8/1978 | Wilkes et al. | |
| 4,349,434 A | | 9/1982 | Jaworski | |
| 4,683,067 A | * | 7/1987 | Aleman et al. | 210/767 |
| 5,015,370 A | * | 5/1991 | Fricano | 210/138 |
| 5,032,293 A | * | 7/1991 | Tuite | 210/788 |
| 5,268,095 A | * | 12/1993 | Barzuza | 210/143 |
| 5,560,820 A | * | 10/1996 | Consolo | 210/104 |
| 5,662,796 A | | 9/1997 | Kerecz | |
| RE35,900 E | | 9/1998 | Meissner | |
| 6,406,621 B1 | * | 6/2002 | Bates et al. | 210/170 |
| 6,416,661 B1 | | 7/2002 | Cordry | |
| 6,423,218 B1 | * | 7/2002 | Lindermeir et al. | 210/170 |
| 6,468,421 B2 | * | 10/2002 | Huckestein | 210/106 |

FOREIGN PATENT DOCUMENTS

| | | | |
|---|---|---|---|
| FR | 2303580 | * | 11/1976 |
| JP | 2002-282617 | * | 10/2002 |
| NZ | 506364 | | 7/2002 |

\* cited by examiner

*Primary Examiner*—Fred G. Prince
(74) *Attorney, Agent, or Firm*—Merchant & Gould P.C.

(57) ABSTRACT

A pump and filtration system for a pond or pool. The filtration mechanism has a filter member in which water with suspended solids in it is forced through the filter member to clean the water. The filter member is positioned in a housing and separated from the walls of the housing by a screen-type separation member. A water jet member increases the flow of the water entering the housing. The filter member is cleaned and solids are flushed from the housing in a back-flush procedure.

27 Claims, 7 Drawing Sheets

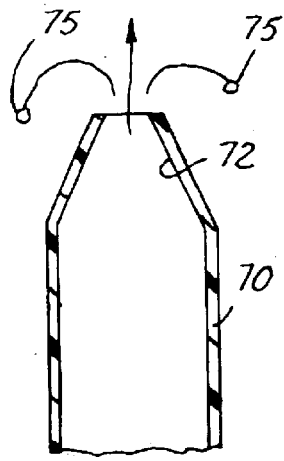
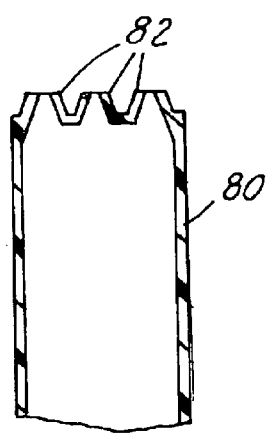
FIG.6   FIG.7
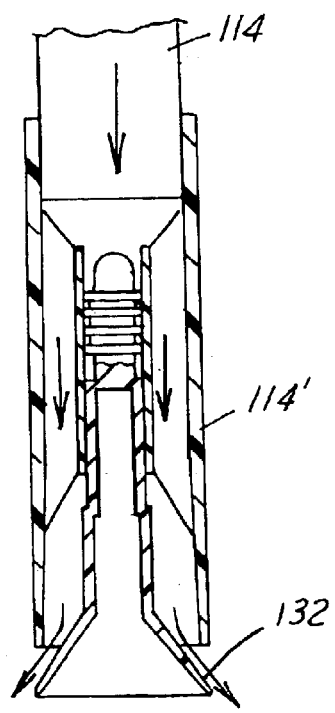
FIG.9
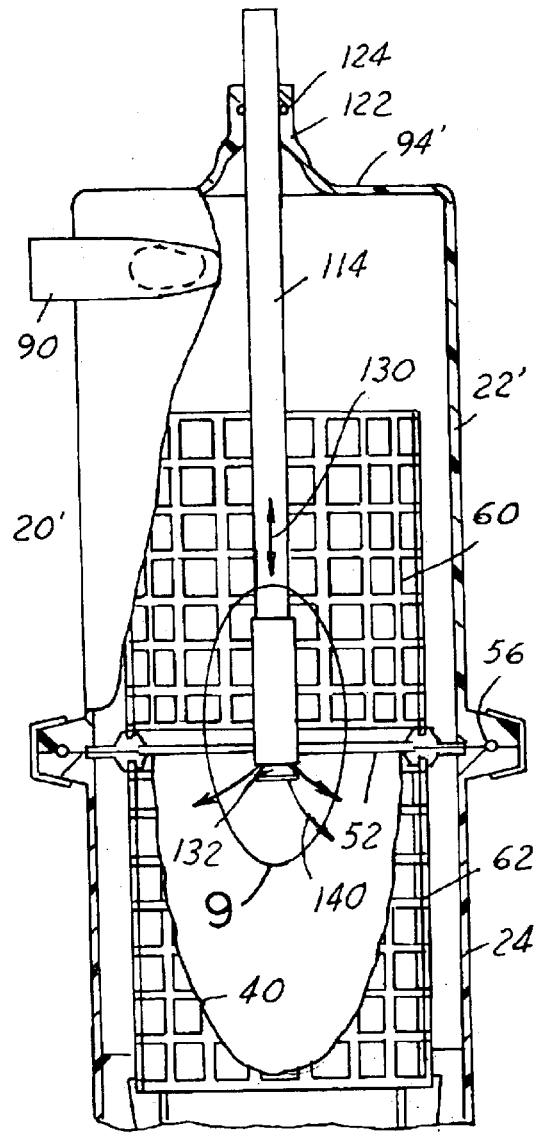
FIG.8

POND FILTER WITH FILTER MEMBER AND NOZZLE

TECHNICAL FIELD

The present invention relates to filter mechanisms and systems for pools, ponds and the like particularly filters which are more efficient and which can be cleaned in a more efficient manner.

BACKGROUND OF THE INVENTION

There are many types of pumping and filtration systems for pools, ponds, and the like, particularly for outdoor fish and serenity ponds. Typically, a pump is used to draw water from the pond and circulate it through a filtration mechanism or system and return the clean water to the pond. Often, the water is also pumped to fountains and waterfalls. The filtration mechanisms often are inefficient and typically have to be dismantled to be cleaned.

In some instances, the filtration system is positioned adjacent to or integral with the pumping mechanism, which is typically submerged in the water in the pond. With these systems, it is necessary to either drain the pond or remove the pump and filtration mechanism from the pool in order to be serviced and cleaned.

Outdoor ponds and pools, in particular, are susceptible to contaminants, such as dirt, leaves and other materials, which can be imparted into the water. These materials could be plant materials (such as leaves), clay, dirt, grasses, pebbles, stones, and any other material common to outdoor environments. These solid and suspended materials are difficult to filter from the pond and often can damage the pump and/or filtration system or reduce their efficiencies.

Accordingly, it is an object of the present invention to provide an improved pond filtration system, particularly one which is more efficient and can be cleaned in a faster and easier manner. It is another object of the present invention to provide a pond pumping and filtration system in which large particles can be removed without adversely affecting the filter media.

It is still another object of the present invention to provide a pond filtration system in which the filtration media can be easily cleaned and particularly without dismantling the system.

These and other objects of the present invention, and solutions to the problems with known pumping and filtration systems for pools, ponds and the like, are met by the present invention.

SUMMARY OF THE INVENTION

In accordance with the present invention, a filter housing is provided which has a collapsible filter bag. The housing is divided into two sections or chambers with the filter bag positioned at the intersection between the sections. Water from the pond or pool is pumped into the housing by a pumping mechanism and is forced upwardly by one or more nozzle members from the lower chamber through the filter bag and into the upper chamber. An outlet in the upper portion of the housing allows clean water to return to the pool or pond.

Large or heavy suspended particles are settled out of the stream of water as it is introduced into the housing. The filter bag is pushed upward by the water flow from the lower chamber into the upper chamber and collects the smaller solid particles from the water.

When the water flow is terminated, the filter bag collapses and turns inside out, falling down into the lower section or chamber of the housing. Loose collected solids fall into the lower chamber and are flushed from the housing. A backflush tubular member with a nozzle is provided in the upper chamber. The nozzle member can be extended down through the inside-out filter bag so that it washes collected particles and solids from the bag and into the bottom chamber. Water from the nozzle washes all of the solids out of the housing through a backflush port. The settled out materials can be diverted to a garden, flower bed, or the like where they can be used as fertilizer.

The present inventive filtration mechanism can be utilized with a solids-handling pump which passes large particles through the pump from the bottom of the pond. Pre-filters which require frequent retrieving of the pump from the pond and cleaning of the pre-filters are eliminated.

Mesh cylinders or cages are positioned in the upper and lower chambers of the housing to space the filter bag from the inner surfaces of the housing. Also, in one embodiment the back-flush tube and nozzle can be removed from the housing when they are not being utilized. The inventive pond filtration system can be positioned adjacent the pond or pool, either above ground or below ground, or positioned at a distance from the pond and/or hidden from view by plants and other foliage.

BRIEF DESCRIPTION OF THE DRAWINGS

FIGS. 6 and 7 illustrate representative inlet water jet nozzle members which can be used with the present invention to introduce water from the pond into the housing;

FIG. 8 is a schematic view of a tubular member and spray nozzle which can be used to clean the filter bag in a back-flush procedure;

FIG. 9 is an enlarged view of a portion of the mechanism shown in FIG. 8;

DESCRIPTION OF THE PREFERRED EMBODIMENT(S)

The present invention provides an improved pumping and filtration system particularly for use with an outdoor pond or pool, particularly an outdoor fish pond. The filtration mechanism provides a filter for the pond which can be cleaned in a quick and easy manner without disassembly of the filter mechanism. Large particles, such as pebbles and stones, can be removed from the water pumped from the pond by being forced upwardly through a nozzle and prior to contact with the filtration media such as a foam filter member or filter bag.

Although the drawings and description herein show and describe the present invention for use with an outdoor pond, it is to be understood that the present pumping and filtration system can be used to clean contaminants and suspended solids from any body of water, including aquariums and pools.

Figure 1:
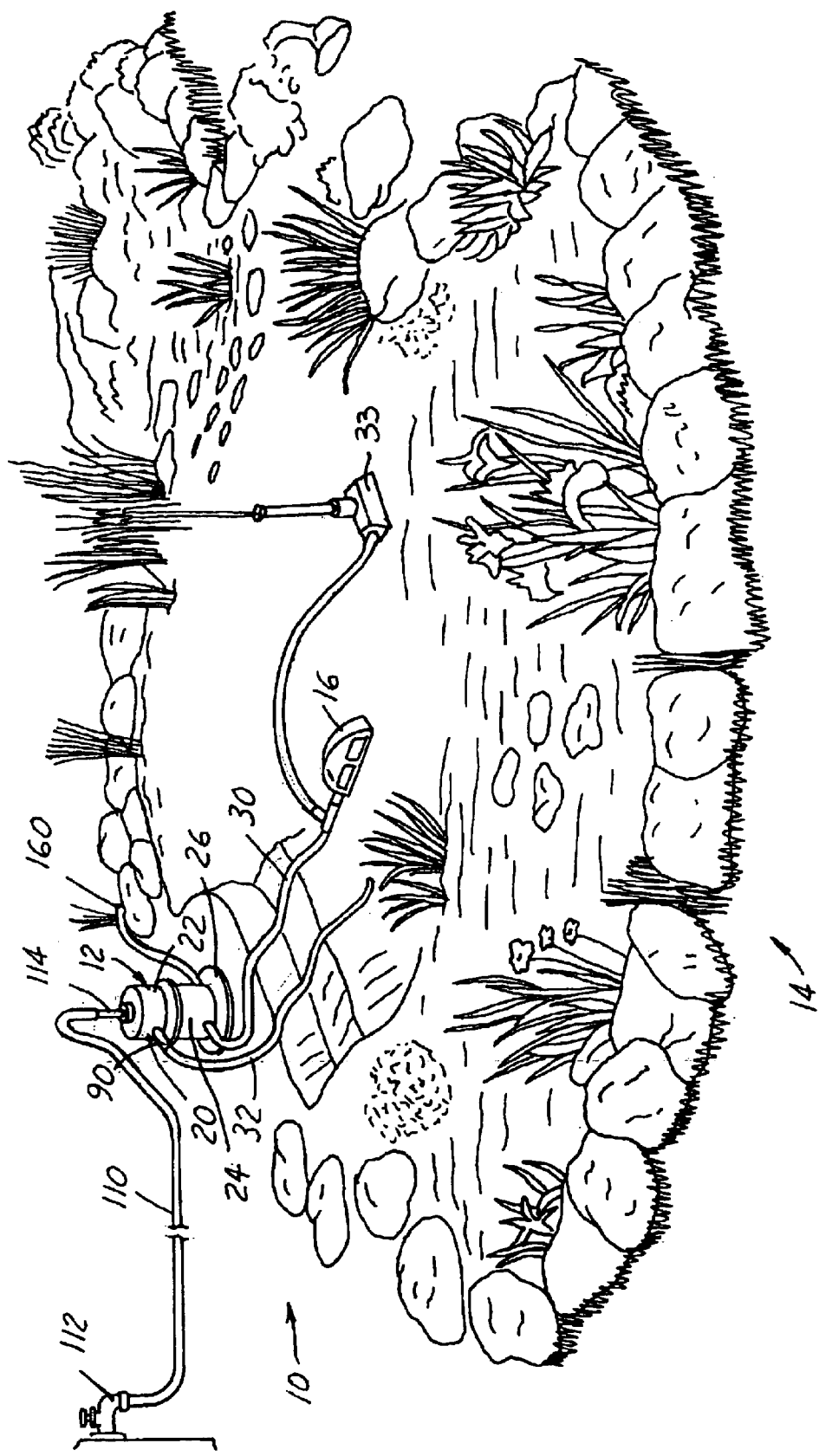
FIG. 1 is a schematic view of a pump and filtration system in accordance with the present invention.
Figure 5:
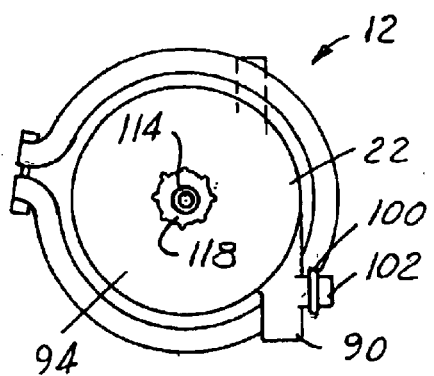
FIG. 5 is an elevational top view of the filtration mechanism of FIGS. 1–4.
Figure 2:
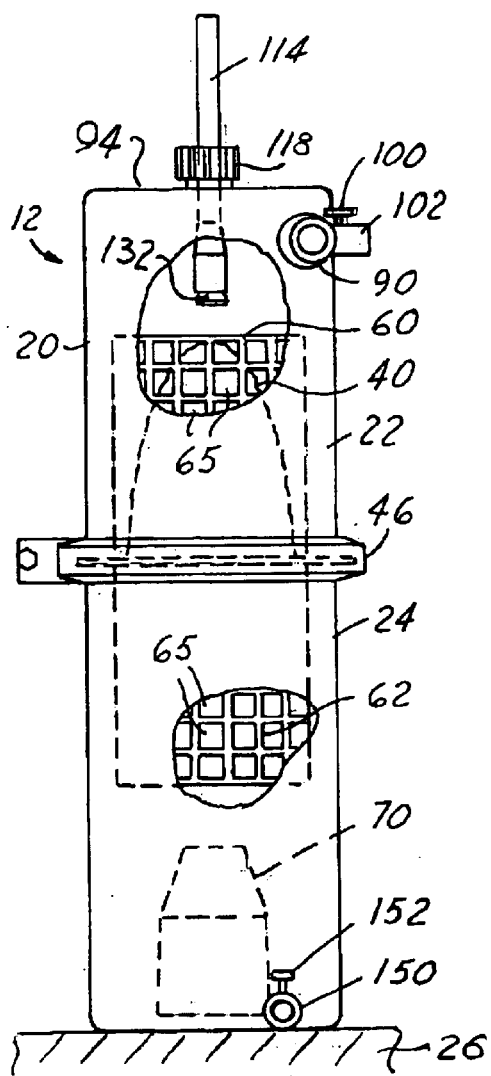
FIG. 2 is an enlarged elevational view of a preferred filtration mechanism in accordance with the present invention with portions broken away.
Figure 3:
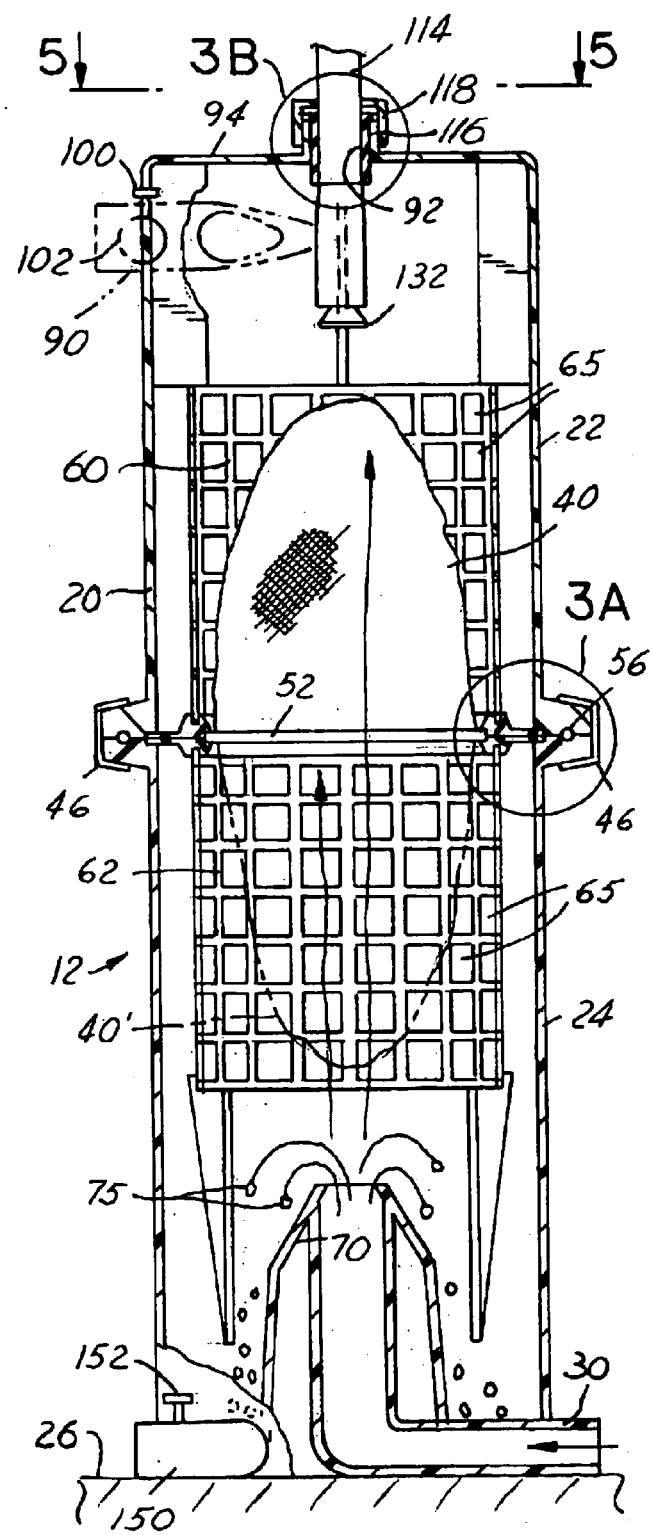
FIG. 3 is a cross-sectional view of the filtration mechanism as shown in FIG. 2.
Figure 4:
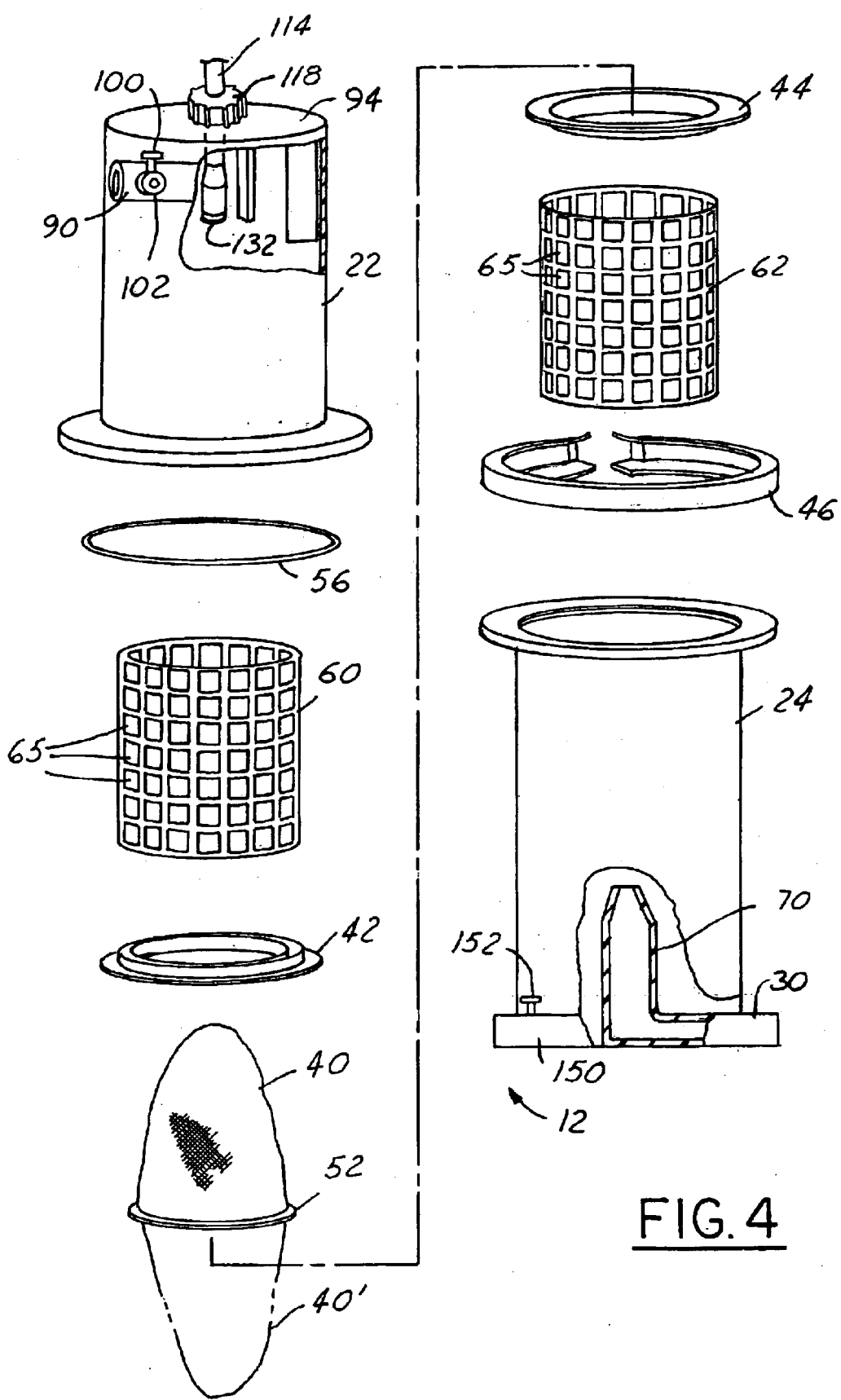
FIG. 4 is an exploded view of the filtration mechanism shown in FIGS. 1–3.

FIG. 1 illustrates a pumping and filtration system in accordance with the present invention when used to clean the water in an outdoor pond. The system is designated generally by the reference numeral 10. FIG. 2 shows a preferred filtration device in accordance with the present invention. FIG. 3 is a cross-section of the filtration device shown in FIGS. 1 and 2, while FIG. 4 is an exploded view of the filtration device. As shown in FIG. 1, the filtration device 12 is positioned adjacent a pond or pool 14. Although the filtration device 12 is shown positioned above ground and adjacent the pond 14, the device 12 could be positioned partially below ground or at a distance from the pond. It is also possible to hide the filtration mechanism 12 with plants or other foliage.

A conventional pump device 16 is positioned in the pond and used to pump and force water to the filtration device 12. The pump can be of any conventional type, but preferably is a pump without a pre-filter and thus adapted to pass solids, such as large particles, through the pump from the bottom of the pond. Pumps which can be used with the present invention include, for example, centrifugal pumps such as centrifugal pump (Model or Series OFX) sold by Tetra Pond, Blacksburg, Va.

Many pond pumps have a pre-filter integral with them, the pre-filter usually being made of a foam or fibrous material. These require frequent retrieving of the pump from the pond for cleaning of the pre-filter. The present invention eliminates the need for a pre-filter type pump and allows the pump to work much longer before it has to be brought from the pond for maintenance.

The filtration device 12 includes a housing member 20 which has an upper section 22 and a lower section 24. The housing member 20 is positioned on a stand or base 26. Water and suspended solids are transported from the pump 16 to the housing 20 through a conduit or hose 30. A second hose 32 is used to transport the filtered water from the filter device 12 back to the pond 14.

As particularly shown in FIGS. 2–4, the filtration device 12 includes a collapsible filter bag 40 which is held in place between the upper and lower sections 22 and 24 of the housing. The filter bag is preferably made of a mesh netting material which will trap suspended solids as water is passed through it. Material of this type which can be used, for example, are polyester, nylon, polyprophylene and the like.

Figure 3A:
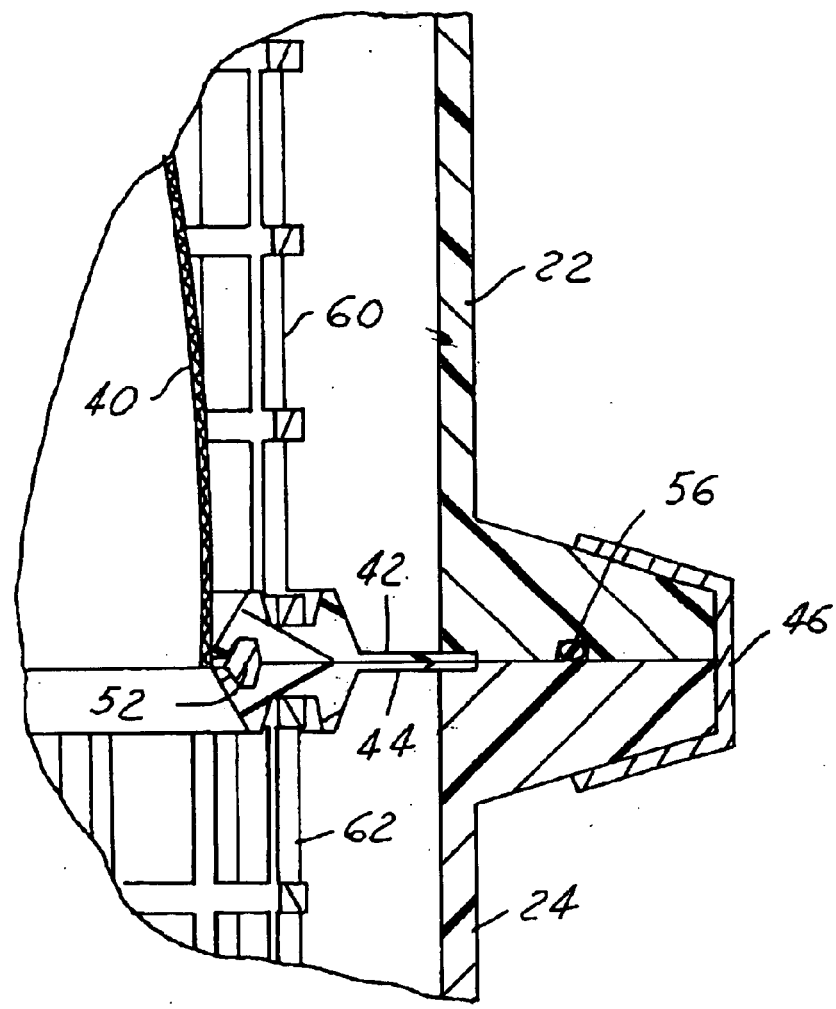
FIG. 3A is an enlarged view of a portion of FIG. 3 indicated by the circle marked "3A"

The filter bag 40 is securely positioned between the upper and lower sections 22 and 24 of the housing 20 by a pair of circular ring members 42 and 44 which are held in place by an outer retention ring 46. (See FIG. 3A.) A sealing member such as O-ring 52, which as shown is an integral part of the filter bag can be used to hold the filter bag in position and seal it relative to the ring members 42 and 44. Alternatively, the filter bag could have a metal or plastic ring sewn or glued or otherwise attached to the open end of the bag, which can be used to position and hold the bag in place relative to ring members 42 and 44. A separate sealing member, such as O-ring 56 is used to seal the joint or intersection between the upper and lower sections 22 and 24.

Also as shown in FIGS. 2–4, a pair of cylindrically shaped screens or mesh retention members 60 and 62 are positioned in the upper and lower sections. The retention members 60, 62 prevent the filter bag 40 from contacting the inner walls of the upper and lower housing sections, which would prevent free water flow through the bag and reduce the filtration effectiveness. The openings 65 in the retention members allow water to pass through them.

The screen members 60 and 62 can be made of any material, such as metal or plastic. The screen members should have sufficiently large openings or spaces 65 in order to allow water passing through the filter bag to also pass through the screen members. The openings can have any shape, such as square (as shown), circular, slotted, or the like.

A nozzle or water jet 70 is positioned in the inlet end of the housing 20 and is used to create changes in the velocity and thus the force of the water flowing into the filtration device 12 and into and through the filter bag 40. The venturi caused by the nozzle member creates changes in the velocity of the water passing through it which causes larger particles to settle out of the stream of water. Then, the water continues up through the filter bag and through the mesh, leaving any suspended particulate and foreign matter entrapped on the surface of the filter bag. A preferred nozzle member 70 is shown in FIG. 6. The nozzle member 70 includes a tapered restricted outlet orifice 72 which is used to increase the velocity of the flow of water through the nozzle.

Also as shown in FIGS. 3 and 6, large particles 75 suspended in the water as it passes through the nozzle 70, fall by their own weight and the force of gravity from the water toward the bottom of the filtration device 12. This prevents the largest particles from possibly damaging the filter bag or clogging it up.

An alternate nozzle member 80 is shown in FIG. 7. Nozzle member 80 has a plurality of nozzle-type outlets 82 which are used to increase the velocity of the water flowing through them. In this regard, any number of nozzle outlets can be utilized with the nozzle member in accordance with the present invention.

FIG. 6 illustrates a nozzle member with a single outlet, while FIG. 7 illustrates a nozzle member with at least three outlets. It is understood, of course, that any number of outlets can be provided and utilized in the nozzle member in accordance with the present invention. Multiple nozzles may be situated on top of a cylindrical plenum through which the water enters in the lower chamber.

The collapsible filter bag 40 is forced upwardly by the flow of water passing through the nozzle member into the position shown in solid lines in FIGS. 3 and 4. In this position, algae and other suspended matter in the flow of water are trapped on the inside of the filter bag while water which passes through it and out the outlet 90 is clean water which is returned to the pond through conduit 32.

If desired, the two housing sections 22 and 24, and particularly the upper housing section 22, can be provided of a clear or transparent material in order to provide a visual indication when the filter bag 40 is dirty and needs cleaning. Transparent housing portions also would allow a visual indication of when the bag was fully cleaned during a back-flush procedure (as described below).

The filter bag can be made of any conventional type of material, such as netting, meshes, or fabrics, and with many different fibers and weaves providing different degrees of particle entrapment. The filter bag 40 is preferably made of a mesh netting material in order to trap suspended solids as they pass through it. Particles which are trapped by the bag allow the bag to become more effective as the filtration process continues. The previously trapped particles will trap smaller and smaller particles, making the water cleaner with each pass through the filter. Eventually the bag will become blocked with the particles, however, to the point where the flow of water is restricted through the bag, and a back-flush or cleaning operation must be performed.

The filter bag will trap all foreign matter and materials in the water, such as algae, suspended dirt or clay particles, ground up organic materials, such as leaves and fish food, and small sticks, grass and the like. Thus, the present invention is capable of handling all of the contaminants and particulate matter which are commonly found in outdoor ponds and pools.

When it is desired to clean the filter bag 40, the pump 16 is turned off, ceasing the flow of water through the filtration device 12. An outlet or backflush port 150 is opened by means of opening of a valve 152. Valve 100 is then opened allowing air to enter the housing through air inlet 102. This causes the water to drain from the housing 20 and causing the filter bag 40 to collapse to the position 40' shown in dotted lines in FIGS. 3 and 4 (and shown in solid lines in FIG. 8). In this manner, the filtered and trapped particulate matter which were formerly on the inside of the filter bag 40 will now be on the outside of the filter bag 40' in the lower section of the housing. Any heavy or loose solid particles collected on the filter bag will fall into the bottom of the lower section, and the remaining material on the filter bag is flushed off with the water.

Figure 3B:
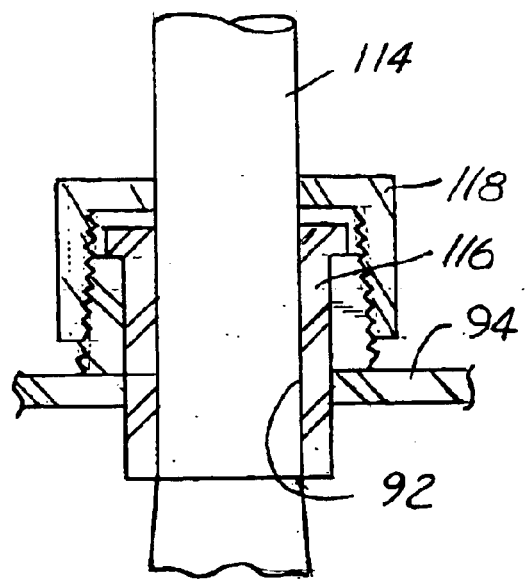
FIG. 3B is an enlarged view of a portion of FIG. 3 indicated by the circle marked "3B"

In this regard, water through hose or conduit 110 which is attached to a faucet 112 or the like, provides back-flush cleaning water through tubular member 114. Tubular member 114 is positioned in a bushing seal member 116, as shown in FIGS. 3 and 3B. Threaded nut member 118 is used to hold the tubular member 114 in position and to tightly hold the sealing member 116 against it and prevent leakage of water from the filtration mechanism.

The tubular member 114 can be moved longitudinally through the opening 92 in the top 94 of the housing 20 and positioned in an appropriate manner to clean the filter bag. In this regard, the movement of the tubular member 114 is shown by the arrow 130 in FIG. 8.

An alternate embodiment for holding the tubular member 114 in position and sealing the sliding relationship is shown in FIG. 8. The top 94' of the housing section 22' has a raised passageway 122 with an O-ring 124, or other sealing member.

A spray nozzle 132 positioned on the end of the tubular member 114 provides an effective spray of clean/back-flush water 140 against the filter bag when the bag is in the position shown in FIG. 8. In this manner, as the tubular member 114 is moved longitudinally in the direction of the arrow 130, the water spray 140 forces the filtered material off of the outer surface of the filter bag and into the bottom of the housing. An outlet 150 operated by valve member 152 is utilized to allow the back-flush water and solid materials to be removed from the housing and filtration device. A conduit, such as a hose or the like 160, is utilized to pass the filtered material to a garden or other location. Often the settled out solids that are flushed from a filter device 12 can be used as fertilizer.

The telescopic tubular member 114 used to back flush and clean the filter bag can also be removed from the housing and filtration device 12 if desired for storage between cleaning cycles. In this regard, a separate solid cap member (not shown) can be utilized to close off and seal the opening 92 in the top portion 94 of the housing 20.

The filtration unit 12 itself can be made in many different sizes so that it can used for varying sizes of pools and ponds. The present invention could also be used for swimming pools and, if provided on a reduced scale, for use relative to aquariums.

Figure 10:
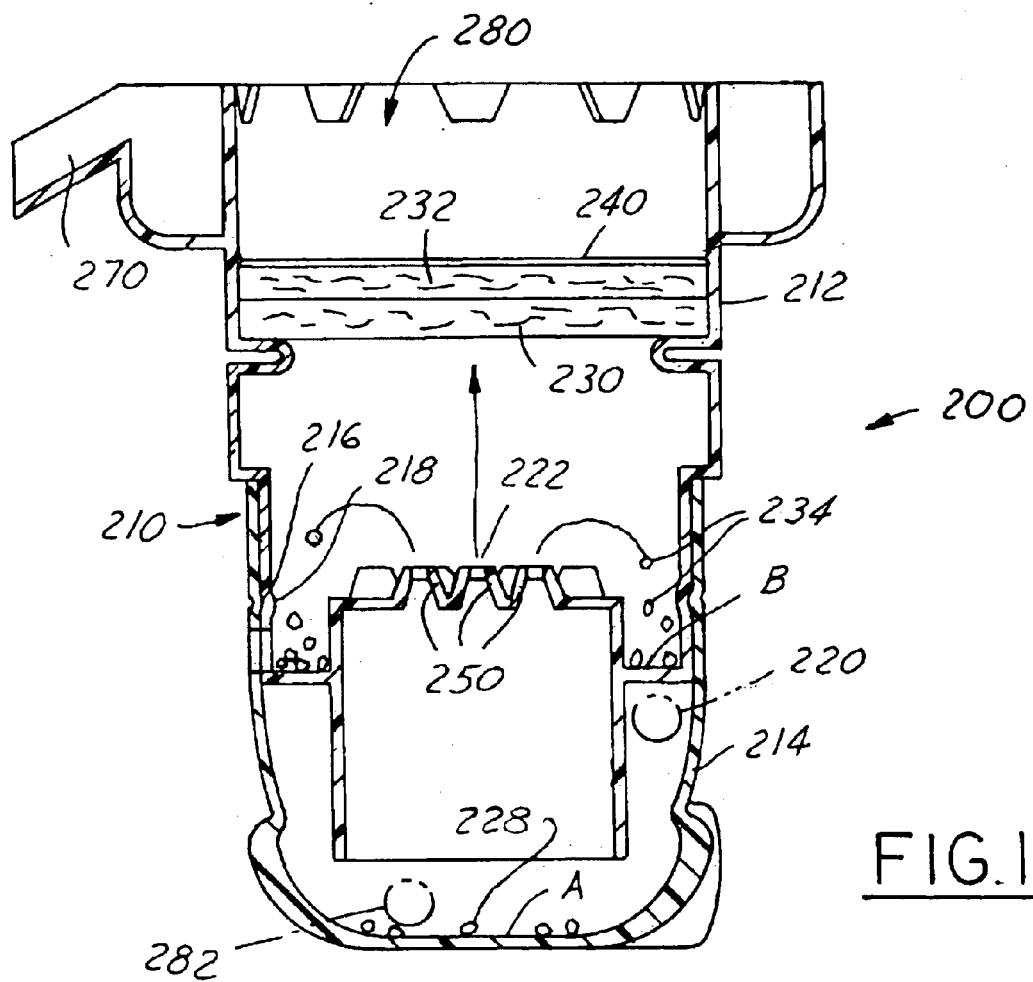
FIG. 10 illustrates an alternate embodiment of the present invention.
Figure 12:
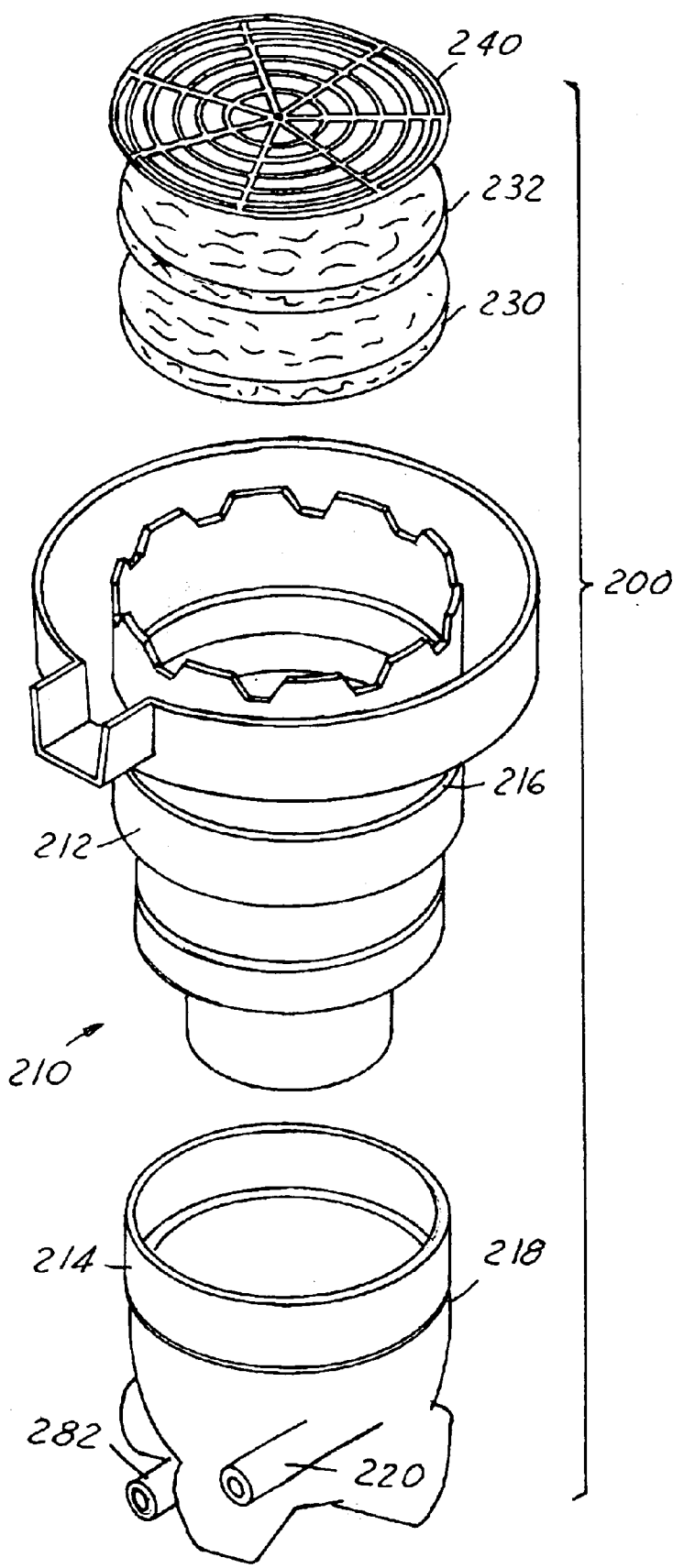
FIG. 12 is an exploded view of the embodiment shown in FIG. 10.

An alternate embodiment of the present invention is shown in FIGS. 10 and 12, and designated generally by the reference numeral 200. This embodiment 200 provides a separate filtration device 210. The device 210 preferably has been upper housing section 212 and a lower housing section 214, which are snapped or otherwise releasably positioned and sealed together. For this purpose, a protruding ridge or rib member 216 is provided on one of the two housing portions and a mating groove 218 is provided in the other housing section. When the two housing sections 212 and 214 are positioned together, the protruding peripheral ridge or rib member fits within the circular groove holding the two housing sections together. Of course, it is to be understood that other securing and fastening mechanisms can be used for this purpose which are conventional and known to persons of ordinary skill in the art.

In the embodiment 200, the pond or pool water enters the housing 210 through inlet 220 flows circularly around the lower portion of the housing section 214 where some of the larger particles 228 are dropped out of the water. Then the water is forced through a nozzle member 222 and through a pair of foam-type filter members 230 and 232. The filter members 230 and 232 are held in place by a screen-type retention device 240. The suspended or entrained solid materials and other foreign matter are collected either in the bottom A of the housing section 214, the circular groove B, or in the filters 230 and 232.

A series of nozzle outlet members 250 are provided on the nozzle or water jet member 222 in order to create a venturi and change the velocity of the water as it is directed against filters 230 and 232. In the same manner as described above with filtration mechanism 12, heavier and larger particles 234 passing through the nozzle 222 will settle and drop out of the water before they impinge upon the filter members 230 and 232. The solid materials are collected in annular groove B in the lower housing member 214.

Clean water passing through the filters 230 and 232 is passed back to the pool or pond through chute member 270. Of course, it is understood that other conventional devices and conduits could be used to convey the clean water from the filtration device 210 back to the pond or pool. An open top filtration unit with an angled chute member 270 is only one of many methods that can be used to return the filtered water to the pond.

The foam-type filters 230 and 232 can be made of different degrees of porosity and with difference size meshes. This sequentially filters the water as it passes through the filtering media with smaller and smaller openings thus entrapping smaller and smaller particulate matter from the water. In this regard, although filter members 230 and 232 are shown in FIGS. 10 and 12, it is to be understood that any number of filter members can be utilized, whether a single filter or a plurality of filters.

Figure 11:
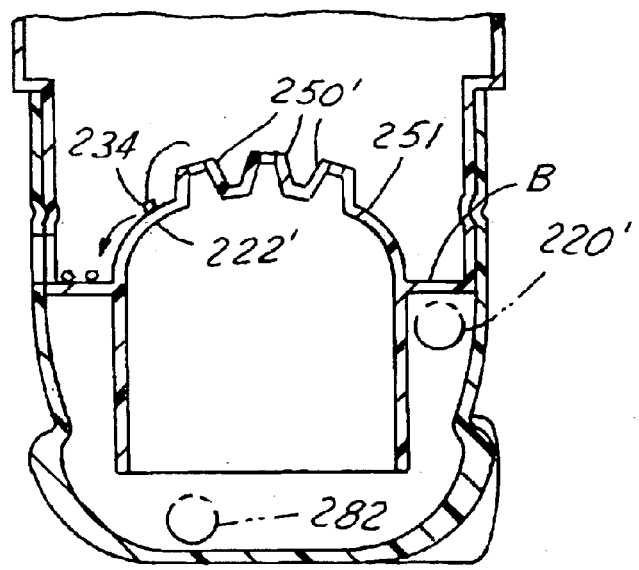
FIG. 11 illustrates an alternate water jet member which can be used with the embodiment of the invention shown in FIG. 10.

An alternate nozzle or water jet member 222' is shown in FIG. 11. In this embodiment, three nozzles 250' are provided and the top surface 251 of the nozzle member is curved or rounded in order to deflect or direct solid particles 234 into groove B.

When it is necessary to clean the filter members in the housing 210, the two housing sections can be separated and all of the members cleaned and washed manually. Alternatively, water can be forced through the upper end 280 of the housing and forced through the filters in the opposite direction forcing any entrapped particulate matter to be directed toward the bottom of the housing. Outlet 282 from the lower portion is activated by a valve mechanism (not shown), allowing the materials to be flushed from the filtration device 200.

While particular embodiments of the invention have been shown and described, numerous variations and alternate embodiments will occur to those skilled in the art. Accordingly, it is intended that the invention be limited only in terms of the appended claims.

What is claimed is:

1. A water filtration apparatus, comprising:
   a filter housing;
   a filter member positioned within the filter housing;
   a nozzle arrangement including a nozzle outlet, the nozzle outlet having a tapered orifice configured to create an increase in fluid velocity as a fluid flows through the tapered orifice; and
   a collection region defined by the housing, the collection region being located adjacent to the nozzle arrangement to collect particles that settle out of the fluid flow due to the increased velocity of the fluid exiting the tapered orifice of the nozzle outlet.

2. The apparatus of claim 1, wherein the collection region includes an annular groove formed in the housing.

3. The apparatus of claim 1, wherein the housing includes a first section and a second section, the collection region being defined by the second section of the housing.

4. The apparatus of claim 1, wherein the housing includes a first section and a second section that detachably interconnect to provide access to the filter member.

5. The apparatus of claim 1, wherein the filter member is a foam filter.

6. The apparatus of claim 1, wherein the filter member is a collapsible filter bag.

7. The apparatus of claim 1, wherein the filter member is retained by a retention screen.

8. The apparatus of claim 1, wherein the nozzle arrangement includes a series of nozzle outlets.

9. The apparatus of claim 8, wherein the series of nozzle outlets are arranged to define a planar top surface of the nozzle arrangement.

10. The apparatus of claim 8, wherein the series of nozzle outlets are arranged to define a curved top surface of the nozzle arrangement.

11. A water filtration arrangement, comprising:
    a housing having a first region and a second region;
    a filter member positioned within the housing, the filter member being located within the first region of the housing during filtration operation; and
    a water jet configured to direct fluid toward the filter member, the water jet being located within the second region of the housing;
    wherein the filter member is located above the water jet member such that during filtration, particles are permitted to fall by their own weight to a bottom of the second region of the housing without entering the first region.

12. The arrangement of claim 11, wherein the water jet includes a tapered orifice configured to increase a velocity of the fluid entering the filter housing.

13. The arrangement of claim 12, wherein the increased fluid velocity causes particles to settle with a groove located within the second region of the housing.

14. The arrangement of claim 13, wherein the groove located within the second region of the housing is an annular groove.

15. The arrangement of claim 11, wherein the housing includes a first section that defines the first region and a second section that defines the second region.

16. The arrangement of claim 15, wherein the first and second sections of the housing detachably interconnect to provide access to the filter member.

17. The arrangement of claim 16, wherein the filter member is a foam filter.

18. The arrangement of claim 16, wherein the filter member is a collapsible filter bag.

19. The arrangement of claim 18, wherein the collapsible filter bag is located within the second region of the housing during backflush operation.

20. The arrangement of claim 11, wherein the filter member is retained by a retention screen.

21. The arrangement of claim 11, wherein the water jet includes a series of nozzle outlets.

22. The arrangement of claim 21, wherein the series of nozzle outlets are arranged to define a planar top surface of the water jet.

23. The arrangement of claim 21, wherein the series of nozzle outlets are arranged to define a curved top surface of the water jet.

24. A method of removing a first sized particulate and a second sized particulate from a flow of fluid, the first sized particulate being sized greater than the second sized particulate, the method comprising the steps of:
    providing a filter device having a housing, a filter member, and a nozzle arrangement, the nozzle arrangement including a tapered orifice;
    directing a fluid flow through the tapered orifice to increase velocity of the fluid flow;
    collecting the first sized particulate in a region located adjacent to the nozzle arrangement as the first sized particulate settles out of the fluid flow due to the increased velocity of the fluid exiting the tapered orifice; and
    directing the fluid flow through the filter member to collect the second sized particulate from the fluid flow.

25. The method of claim 24, further including providing a nozzle arrangement having a planar top surface and directing the fluid flow toward the filter member of the filter device.

26. The method of claim 25, further including collecting the first sized particulate without the first sized particulate contacting the filter member.

27. The method of claim 24, further including providing a nozzle arrangement having a curved top surface and deflecting the first sized particulate toward the region located adjacent to the nozzle arrangement.

* * * * *

UNITED STATES PATENT AND TRADEMARK OFFICE
CERTIFICATE OF CORRECTION

PATENT NO. : 6,893,573 B2
DATED : May 17, 2005
INVENTOR(S) : Dover et al.

It is certified that error appears in the above-identified patent and that said Letters Patent is hereby corrected as shown below:

Column 7,
Line 27, "to the increased velocity of the fluid exiting the tapered" should read -- to a change in velocity of the fluid as the fluid exits the tapered --.

Column 8,
Line 3, "the fluid entering the filter housing." should read -- the fluid exiting the water jet. --.
Lines 4-5, "wherein the increased fluid velocity causes particles to settle with a groove located" should read -- wherein a change in velocity of the fluid as the fluid enters the filter housing causes particles to settle with a groove located --.
Lines 46-47, "due to the increased velocity of the fluid exiting the tapered" should read -- due to a change in velocity of the fluid as the fluid exits the tapered --.

Signed and Sealed this

Eleventh Day of October, 2005

JON W. DUDAS
*Director of the United States Patent and Trademark Office*